(No Model.) 2 Sheets—Sheet 1.

T. BOUTWELL & A. P. MAGEE.
COMBINATION HARROW AND CULTIVATOR.

No. 511,038. Patented Dec. 19, 1893.

Witnesses

Inventors
Theodore Boutwell and
Andrew P. Magee
By their Attorneys,

THE NATIONAL LITHOGRAPHING COMPANY,
WASHINGTON, D. C.

(No Model.) 2 Sheets—Sheet 2.
T. BOUTWELL & A. P. MAGEE.
COMBINATION HARROW AND CULTIVATOR.
No. 511,038. Patented Dec. 19, 1893.
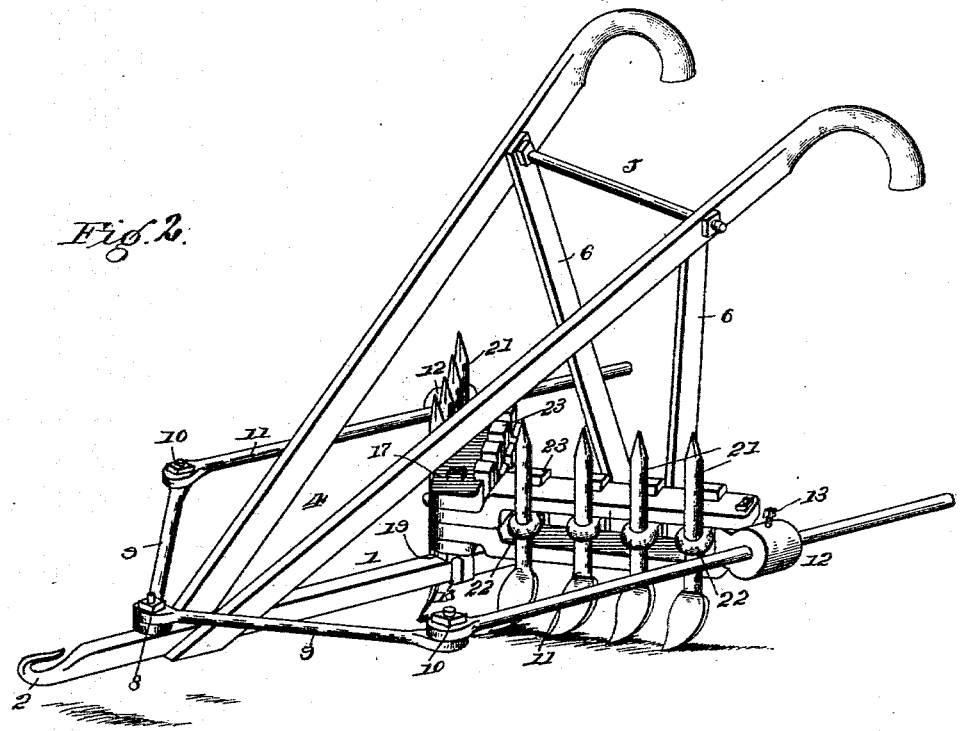
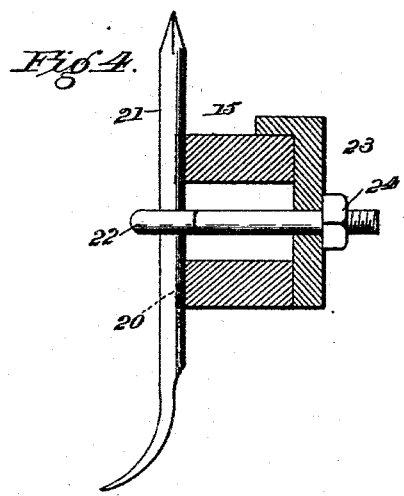
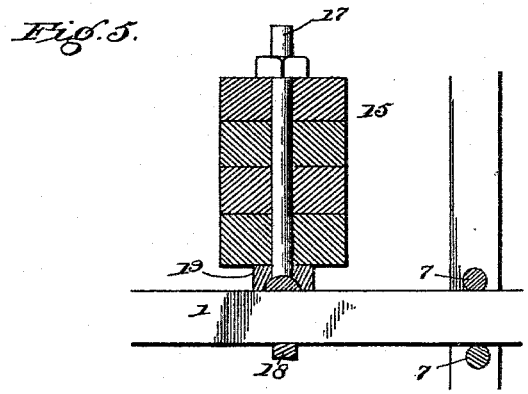
Witnesses:
F. M. Johnson
W. S. Duvall
Inventors
Theodore Boutwell
Andrew P. Magee
By their Attorneys,
C. A. Snow & Co.

UNITED STATES PATENT OFFICE.

THEODORE BOUTWELL AND ANDREW P. MAGEE, OF FRANKLINTON, LOUISIANA.

COMBINATION HARROW AND CULTIVATOR.

SPECIFICATION forming part of Letters Patent No. 511,038, dated December 19, 1893.

Application filed September 22, 1893. Serial No. 486,196. (No model.)

*To all whom it may concern:*

Be it known that we, THEODORE BOUTWELL and ANDREW P. MAGEE, citizens of the United States, residing at Franklinton, in the parish of Washington and State of Louisiana, have invented a new and useful Combination Harrow and Cultivator, of which the following is a specification.

Our invention relates to agricultural machines; and the objects in view are to provide a machine of cheap, simple and durable construction, and which may be readily converted to any of the ordinary styles of cultivators or harrows as may be desired, and which may be made to cultivate fine or coarse as desired.

Various other objects and advantages of the invention will appear in the following description, and the novel features thereof will be particularly pointed out in the claims.

Figure 1:
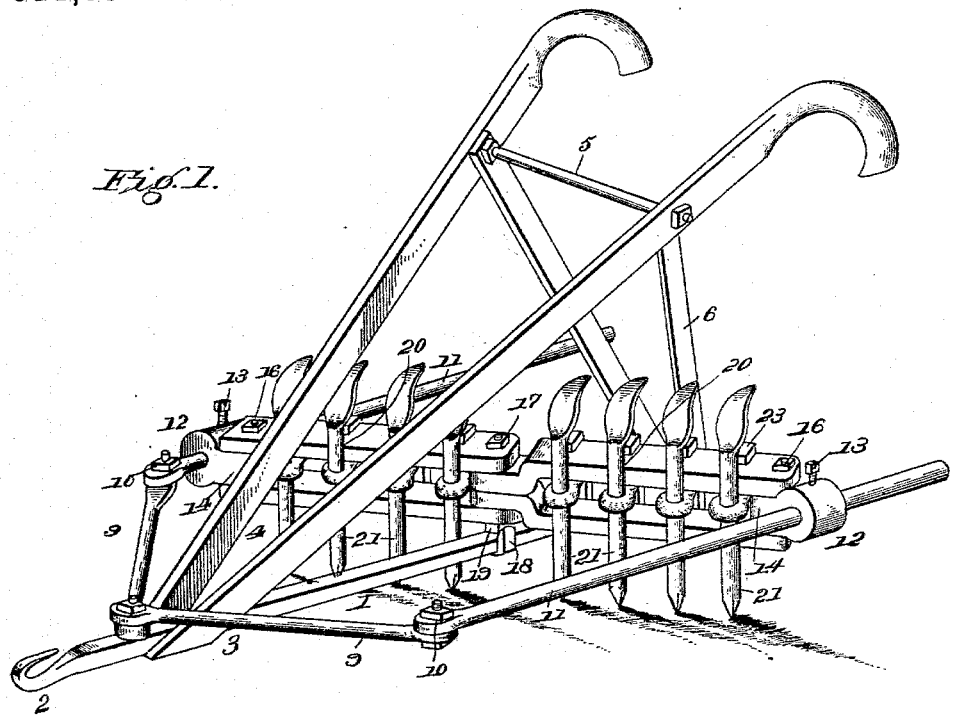
Figure 3:
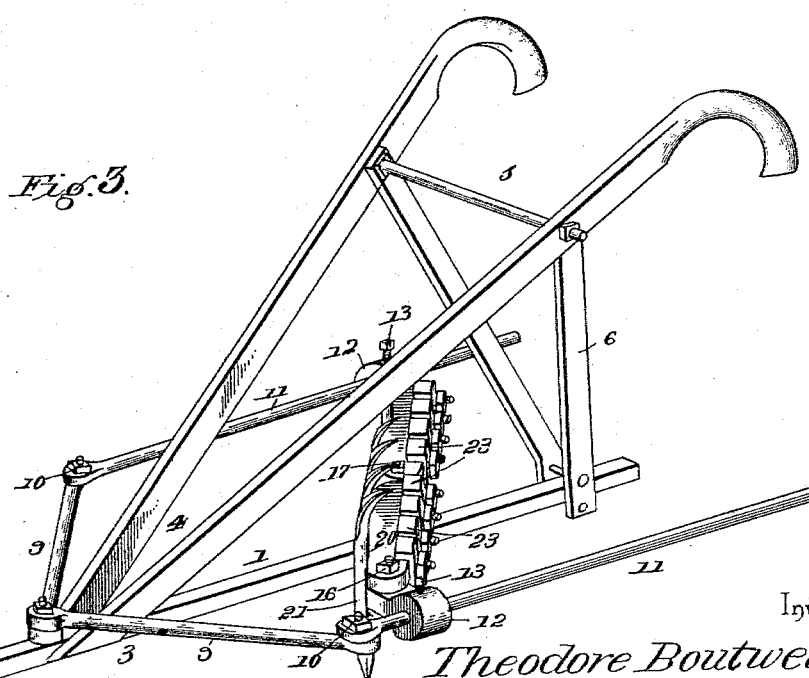

Referring to the drawings:—Figure 1 is a perspective view of our machine, the same being arranged as a left hand side harrow. Fig. 2 is a similar view, the machine being arranged as a V-shaped harrow. Fig. 3 is a view similar to Fig. 1, the same being arranged as a right hand cultivator. Fig. 4 is a transverse section through the cultivator or harrow-bar. Fig. 5 is a sectional view through the cultivator or harrow-bar, and the main beam.

Like numerals of reference indicate like parts in all the figures of the drawings.

In the practice of our invention we employ a main or central beam 1, which terminates at its front end in a suitable draft hook 2 designed to receive the usual draft-appliances. A short distance in rear of the hook and bolted to the opposite sides of the main or central beam 1, as indicated at 3, is a pair of inclined, divergent handle-bars 4 terminating at their rear ends in handles designed to be grasped by the operator, and in advance of the same said bars are connected and supported at a suitable distance apart by a transverse tie-rod 5. Inclined braces 6 have their upper ends braced by the tie-rod, and are secured in place by nuts which are applied to the tie-rod, as shown, so as to clamp the braces and the handle-bars. The lower ends of the braces are bolted to the beam 1 by means of a pair of clamping-bolts 7, and by an adjustment of these bolts upon the beam the handle may be raised and lowered in a manner obvious.

A vertical bolt 8 passes through the beam 1 between the front ends of the handle-bars 4 and the draft-hook 2, and upon this are pivoted the front ends of a pair of rods 9. These rods are pivoted at their rear ends by bolts 10 to a pair of rear rods 11, each of which has mounted thereon a cuff or sleeve 12 through which extends a binding-screw 13 whose inner end is designed to bind upon the rod 11 upon which the said cuff or sleeve may be mounted. Each cuff or sleeve is provided at its inner side with a horizontal extension 14, and to the same are pivoted pairs of bars 15, the same being arranged above and below the said extensions and secured in position in the manner indicated by means of vertical pivoting-bolts 16. One of the pairs of bars 15 has its inner ends brought together or offset and interposed between the inner ends of the opposite pair, the two pairs being connected pivotally by means of a vertical bolt 17 which is provided upon its lower end with an eye 18 designed to move loosely over the main beam 7. A saddle-plate or washer 19 is perforated to receive the bolt 18 and straddles the eye, the ends of the plate bearing upon the upper side of the beam, so that by tightening the nut upon the upper end of the bolt 17 the said eye is caused to draw upward upon the beam and the saddle-plate or washer is forced downward so that between the two the said beam is clamped tightly. The front edges of the pairs of bars 15 are provided with vertical, aligning recesses or tooth-seats 20 and in any pair of the same are seated vertical combination teeth 21. These combination teeth 21 are spike-shaped at one end and shovel-shaped at the other end, the spike-ends serving as harrow-teeth and the shovel-ends serving as cultivator-teeth, so that, as will be obvious, the teeth are reversible. Eye-bolts 22 receive the teeth and extend between the harrow-bars 15 to points in rear thereof, said bolts extending through angular clamping-plates 23 which embrace the said arms 15 upon their upper sides. The bolts are provided in rear of the angle-plates with nuts 24, whereby the eye-bolts are caused to bind or clamp the teeth in position against the bars.

This completes the construction of the invention, and the operation thereof will be obvious therefrom. Attention, however, is called to Figs. 1, 2 and 3 of the drawings, in which we have illustrated some of the many positions the harrow or cultivator may be caused to assume. In the first figure we have illustrated a left-hand or side-harrow, and to convert the same to a right-hand or side harrow or cultivator it is simply necessary to loosen the nuts on the bolts 16, 13, 17 and 10, when it will be seen that the harrow-bar as a whole may be slid forward or backward upon the main beam 1 and the sleeves 12 moved along the rods 11 so as to throw either end of the same in front, and hence dispose the cultivator or harrow as a whole diagonally to the line of draft. By moving the inner ends backward upon the main beams 1 and the outer ends forward, we then obtain a V-shaped harrow with the open side of the V in front, or, on the other hand, by moving the inner ends of the bars forward and the outer ends backward we obtain a V-shaped harrow with the convexed end in front. Of course by reversing the teeth the harrow is altered to cultivate, and the same operation may take place with the teeth in that position.

We do not limit our invention to the precise details of construction herein shown and described, but hold that we may make such variations therein as will suggest themselves during the practical operation of the machine.

Having described our invention, what we claim is—

1. In a harrow, the combination with a central beam, opposite pivoted rods connected therewith, rods pivoted to the outer ends of the first mentioned rods, sleeves mounted adjustably upon the latter rods, of intermediate harrow-bars pivoted to the sleeves, and a sliding adjustable connection between the inner ends of the harrow-bars and the main beams, substantially as specified.

2. In a harrow, the combination with a main-central beam, a pair of pivoted rods arranged thereon near the front end thereof, and opposite side rods pivoted to the outer ends of the front rods, of sleeves provided with extensions loosely mounted on the side rods, binding-screws for the sleeves adapted to impinge upon the rods, a pair of harrow-bar sections pivoted to the extensions of the sleeves, teeth carried thereby, and an adjustable connection between the inner ends of the harrow-bar sections and the main beam, substantially as specified.

3. In a harrow, the combination with a main-beam, a pair of rods pivoted at their inner ends to the same, and a pair of side rods pivoted at their front ends to the outer ends of the first mentioned rods, sleeves mounted loosely on the side-rods and provided with extensions, binding-bolts arranged upon the sleeves and impinging upon the side-rods, opposite pairs of notched harrow-bars embracing the extensions and pivotally bolted thereto, an eye-bolt arranged upon the main beam and extending through the inner ends of the harrow-bars, a concaved saddle or washer arranged upon the eye-bolt and between the harrow-bars and beam 1 and bearing on the latter, and the nut upon the upper end thereof, substantially as specified.

In testimony that we claim the foregoing as our own we have hereto affixed our signatures in the presence of two witnesses.

THEODORE BOUTWELL.
ANDREW P. MAGEE.

Witnesses:
W. A. BURRIS,
W. Y. WOOD.